US012387507B2

(12) United States Patent
Al-Maadeed et al.

(10) Patent No.: US 12,387,507 B2
(45) Date of Patent: *Aug. 12, 2025

(54) MOVING OBJECT AND OBSTACLE DETECTION PORTABLE DEVICE USING A MILLIMETER WAVE RADAR AND CAMERA

(71) Applicant: QATAR UNIVERSITY, Doha (QA)

(72) Inventors: Somaya S. A. Ali Al-Maadeed, Doha (QA); Noor Al-Maadeed, Doha (QA); Mohamed-Zied Chaari, Doha (QA); Younes Akbari, Doha (QA); Omar Elharrouss, Doha (QA); Aisha Abdulla Al-Qitairi, Doha (QA); Alanood Ahmed Al-Thani, Doha (QA); Aldana Alsalem, Doha (QA)

(73) Assignee: QATAR UNIVERSITY, Doha (QA)

( * ) Notice: Subject to any disclaimer, the term of this patent is extended or adjusted under 35 U.S.C. 154(b) by 379 days.

This patent is subject to a terminal disclaimer.

(21) Appl. No.: 17/566,268

(22) Filed: Dec. 30, 2021

(65) Prior Publication Data

US 2022/0207891 A1 Jun. 30, 2022

Related U.S. Application Data

(60) Provisional application No. 63/132,391, filed on Dec. 30, 2020.

(51) Int. Cl.
*G06K 9/00* (2022.01)
*G01S 13/58* (2006.01)
(Continued)

(52) U.S. Cl.
CPC ............ *G06V 20/64* (2022.01); *G01S 13/583* (2013.01); *G01S 13/89* (2013.01); *G06T 5/50* (2013.01);
(Continued)

(58) Field of Classification Search
CPC ............ G06T 7/70; G06T 2207/30196; G06T 2207/30221; G06T 2207/30224;
(Continued)

(56) References Cited

U.S. PATENT DOCUMENTS

2009/0292468 A1* 11/2009 Wu .................. G08G 1/165
342/146
2015/0309168 A1* 10/2015 Mizutani ............. G01S 13/931
342/27

(Continued)

OTHER PUBLICATIONS

Bin Yang, Junjie Yan, Zhen Lei, and Stan Z. Li, âAggregate Channel Features for Multi-view Face Detectiona, Center for Biometrics and Security Research & National Laboratory of Pattern Recognition Institute of Automation, Chinese Academy of Sciences, China, Sep. 3, 2014 (Year: 2014).*

*Primary Examiner* — Atiba O Fitzpatrick
(74) *Attorney, Agent, or Firm* — SQUIRE PATTON BOGGS (US) LLP

(57) ABSTRACT

Systems, methods, apparatuses, and computer program products for detecting, identifying, and monitoring objects. One method may include detecting, by a camera, at least one object according to at least one coordinate; detecting, by a sensor, at least one object according to at least one coordinate; fusing, by a computer vision application, the at least one coordinate of the at least one object detected by the camera with the at least one coordinate of the same at least one object detected by the sensor; determining, by a computer vision application, whether the number of objects detected by the camera equals the number of objects detected by the sensor; and determining, by the computer vision application, whether a score associated with the one or more additional functions is below a predetermined threshold.

13 Claims, 7 Drawing Sheets

(51) Int. Cl.
   *G01S 13/89* (2006.01)
   *G06T 5/50* (2006.01)
   *G06V 20/64* (2022.01)

(52) U.S. Cl.
   CPC ............... *G06T 2207/20024* (2013.01); *G06T 2207/20221* (2013.01); *G06T 2207/30242* (2013.01)

(58) Field of Classification Search
   CPC . G06T 2207/30228; G06T 2207/30232; G06T 2207/30236; G06T 2207/30241; G06T 2207/30248; G06T 2207/30261; G06T 2207/20212; G06T 2207/20221; G06T 2207/10028; G06T 7/521; G06T 2207/30242; G06V 20/52; G06V 20/53; G06V 20/54; G06V 40/00; G06V 40/10; G06V 40/103; G01S 13/867
   See application file for complete search history.

(56) References Cited

U.S. PATENT DOCUMENTS

| | | | | |
|---|---|---|---|---|
| 2018/0314916 A1* | 11/2018 | Bovyrin | .................. | G06V 20/56 |
| 2019/0333233 A1* | 10/2019 | Hu | ........................ | G01S 13/04 |
| 2020/0193182 A1* | 6/2020 | Kim | ........................ | G06V 20/58 |
| 2022/0019829 A1* | 1/2022 | Tal | ........................ | H04N 7/185 |
| 2022/0036047 A1* | 2/2022 | Steinberg | ............. | G06V 40/166 |
| 2022/0146664 A1* | 5/2022 | Ichiki | ...................... | G01S 7/403 |

* cited by examiner

MOVING OBJECT AND OBSTACLE DETECTION PORTABLE DEVICE USING A MILLIMETER WAVE RADAR AND CAMERA

CROSS-REFERENCE TO RELATED APPLICATION

This application claims the benefit of U.S. Provisional Application No. 63/132,391, filed Dec. 30, 2020. The entire content of the above-referenced application is hereby incorporated by reference.

TECHNICAL FIELD

Some example embodiments may generally relate to monitoring a physical environment. For example, certain example embodiments may relate to systems and/or methods for detecting, identifying, and monitoring objects.

BACKGROUND

Various sensors can collect environmental information to detect, track, and recognize moving objects, such as pedestrians and vehicles, which may be useful for commercial, industrial, and governmental applications. Existing techniques may be automated and/or based upon real-time computer-vision methods; thus, accuracy is critical to ensure reliable and safe results are provided, as well as to be commercially advantageous over other techniques. The design and implementation for these scenarios can be automated, and may be based on computer vision methods. However, some existing techniques may rely exclusively upon cameras controlled by software. As a result, object detection by a camera can be hindered by factors such as an excessive number of objects, overlapping objects, and insufficient lighting. Furthermore, radar devices can detect objects and their location with greater accuracy than a camera; however, radar devices alone cannot identify objects and the surrounding environment.

In general, crowd counting may be important for security and/or business analysis to provide context for other performance metrics of the business. As an example, for large events, such as FIFA World Cup events, counting people may help to manage and secure crowds. In security applications, crowd counting metrics may be used to evaluate crowd safety and stability, and counting crowd density levels may be important for scientific research topics.

SUMMARY

In accordance with certain example embodiments, an apparatus may comprise at least one camera, at least one sensor, and at least one computing device configured to run a computer-vision application.

In accordance with some example embodiments, a method may include detecting, by a camera, at least one object according to at least one coordinate. The method may further include detecting, by a sensor, at least one object according to at least one coordinate. The method may further include fusing, by a computer vision application, the at least one coordinate of the at least one object detected by the camera with the at least one coordinate of the same at least one object detected by the sensor. The method may further include determining, by a computer vision application, whether the number of objects detected by the camera equals the number of objects detected by the sensor. The method may further include determining, by the computer vision application, whether a score associated with the one or more additional functions is below a predetermined threshold.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for detecting, identifying, and monitoring objects is not intended to limit the scope of certain example embodiments, but is instead representative of selected example embodiments.

Certain example embodiments described herein may have various benefits and/or advantages to overcome the disadvantages described above. By utilizing some embodiments described herein, detection accuracy during object detection may be improved by combining mm-wave sensors with cameras configured to perform computer-vision tasks, including enhanced visualization using cameras and rebuses of detection using radar. Furthermore, certain example embodiments may be used in various computer vision areas for improving accuracy and/or reliability, and it may be an important field for the correct development of many multi-disciplinary applications, such as traffic supervision, surveillance of large facilities, and security inspections. The detection capabilities of a combination of camera and radar can improve the detection and identification of moving objects in various example embodiments.

Furthermore, as noted above, a challenge in the prior art with these types of devices is accuracy. Certain example embodiments discussed herein may mitigate inaccuracies by using a reliability score, and comparing it against a threshold for each subsystem of the computer vision application. The threshold may depend on the degree of the importance in the used commercial environment, with increasing importance set closer to 100%. Additionally, in order to quickly process the recognition rate in each subsystem, video and images may be sent to the human operator for enhanced verification. Thus, certain example embodiments discussed below are directed to improvements in computer-related technology.

Figure 1A:
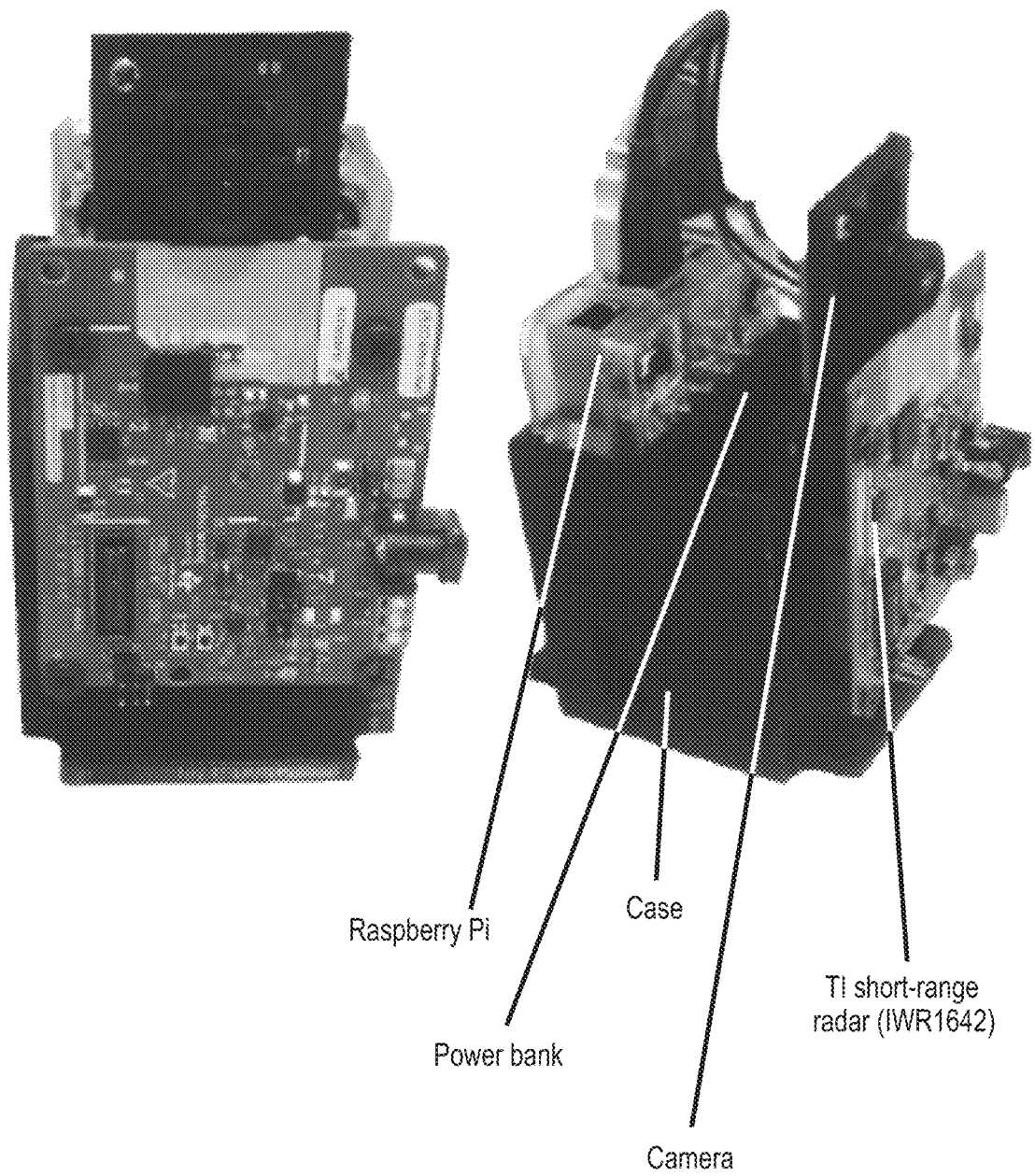
FIG. 1A illustrates an example of an apparatus according to various embodiments.

In order to overcome the disadvantages described above, some example embodiments described herein may combine any combination of millimeter-wave radar, cameras, and control software, similar to the system illustrated in FIG. 1A. The combination of millimeter-wave radar and cameras, along with a computing device to perform various computer-vision processing tasks, is novel.

Figure 2:
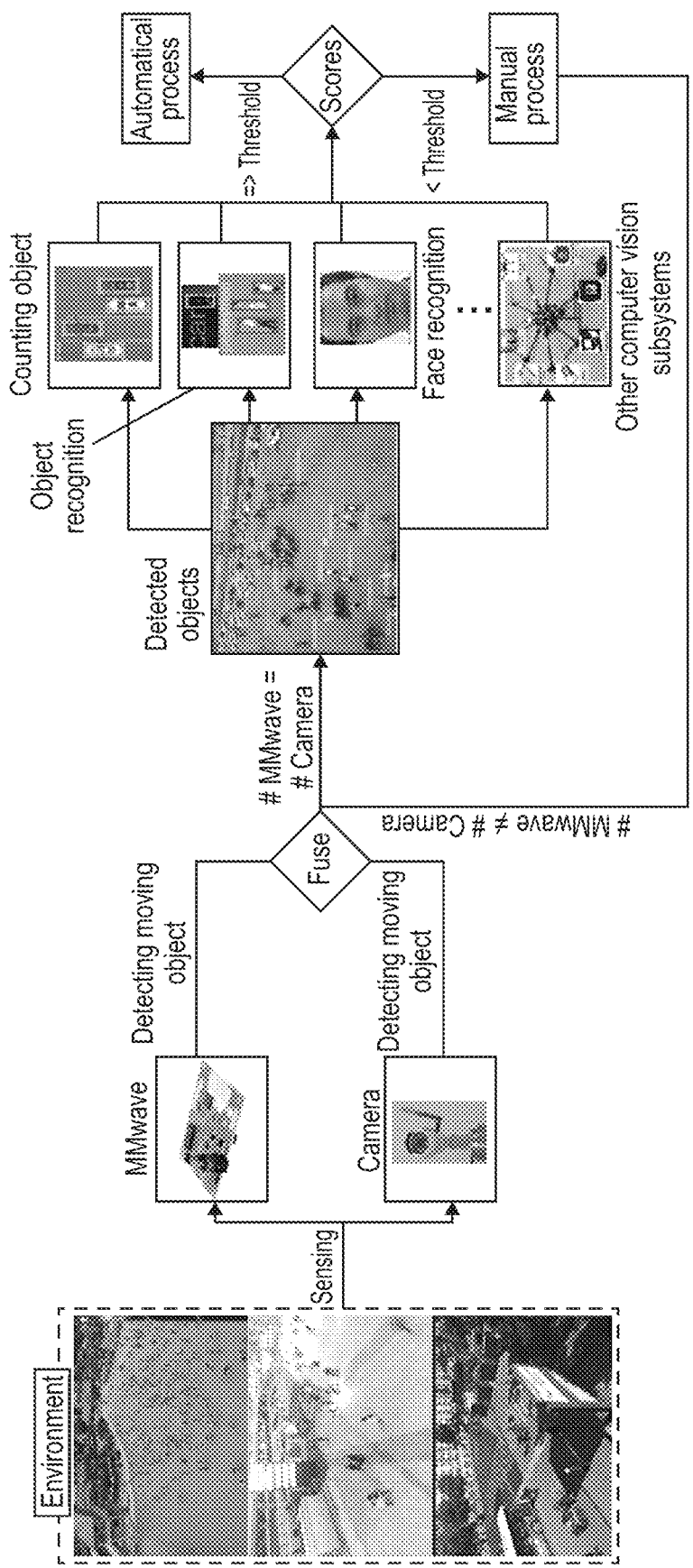
FIG. 2 illustrates an example of a procedure according to certain example embodiments.
Figure 4B:
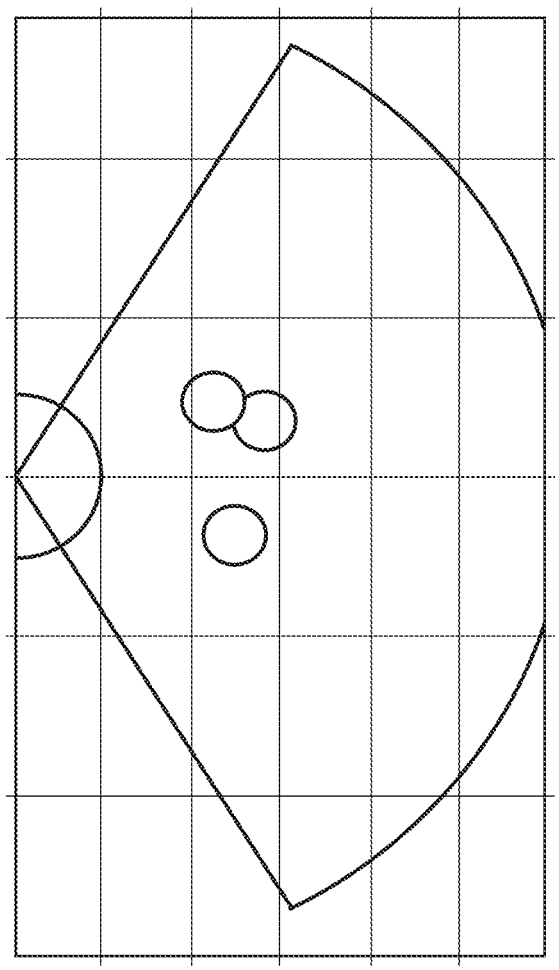
FIG. 4B illustrates an example of the results of the detection of objects by a sensor according to some example embodiments.
Figure 4A:
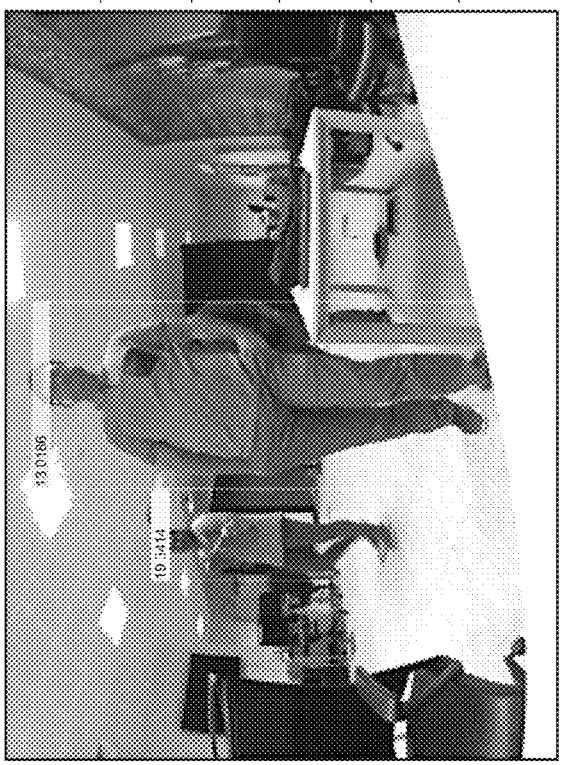
FIG. 4A illustrates an example of the results of the detection of objects (people) by a camera according to various example embodiments.

As will be explained in more detail below, various example embodiments may incorporate a variety of types of detection devices with computer-vision applications. FIG. 2 illustrates an overall procedure for operating a detection device in conjunction with computer-vision applications according to various example embodiments. Specifically, a camera and mm-wave sensor may gauge the environment to detect multiple objects moving simultaneously. Upon receiving and analysing data collected by the sensor and camera, the software may determine whether to continue evaluating the collected data autonomously or non-autonomously (e.g., with the aid of a human reviewer). As an example, if the sensor and camera do not detect the same number of objects (e.g., an object falls below a threshold confidence level in order to be considered detected), the system may not continue with the image processing procedure shown in FIG. 2. For example, as illustrated in FIGS. 4A and 4B, people which overlap may not be included in the results when the sensors detected a different number of objects (e.g., the camera detects 2 objects while radar detects 3 objects), thereby removing some potential inaccuracies from the results.

A device may be configured to count people indoors and outdoors. Information collected by the device can then be integrated with other assistance systems to facilitate decision making, such as by managers. For companies, a device according to certain example embodiments may determine the number of customers that are shopping.

The image processing procedure depicted in FIG. 2 may be tested in an experimental situation. When the results of the sensor and camera are obtained, it may be decided whether to continue subsequently processes automatically or in some other way. If the number of detected objects is not equal in both sensors (which may suggest the presence of inaccuracies), the system may not accept the results to continue, and the steps may be processed in some other way.

Figure 1B:
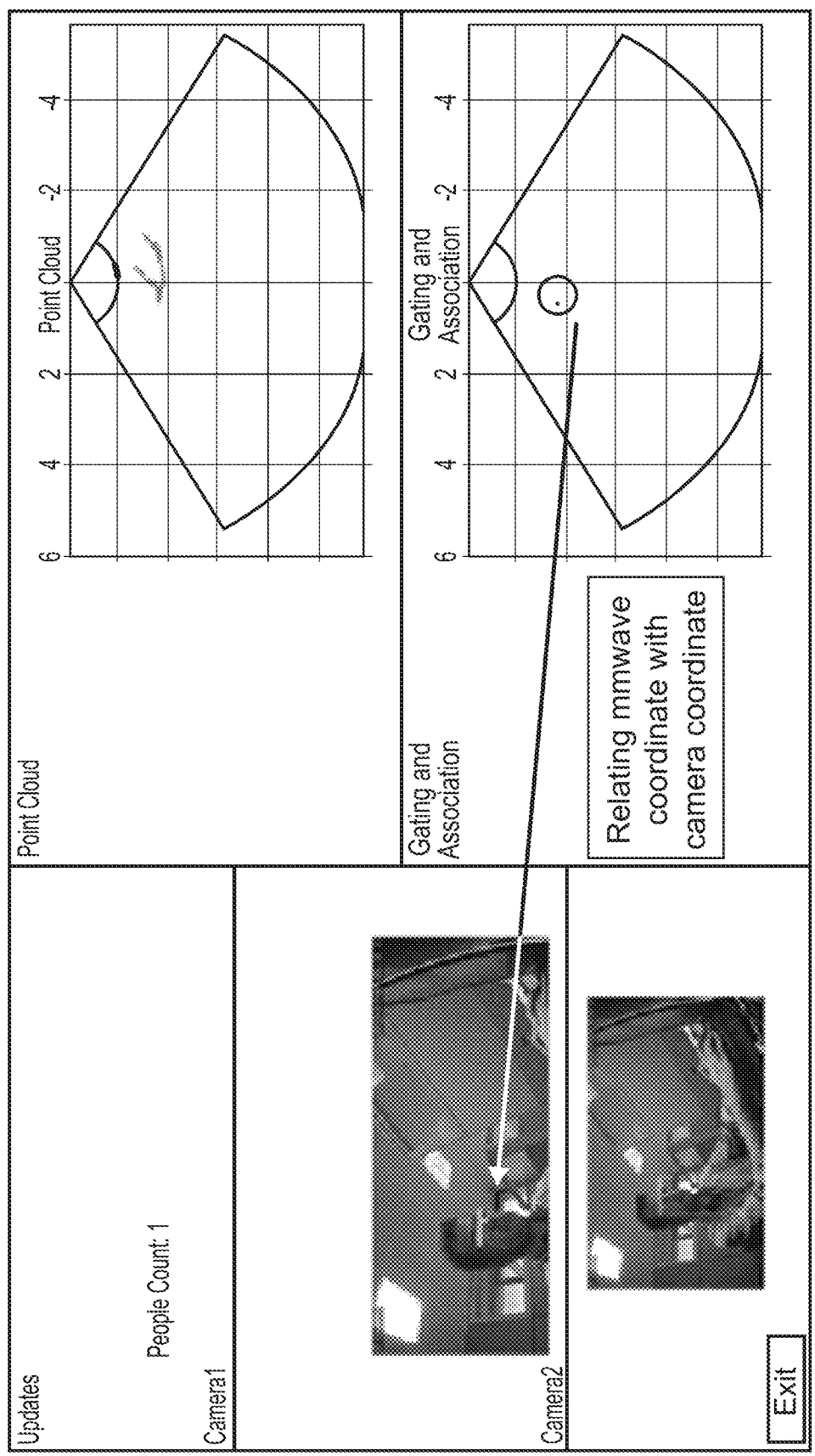
FIG. 1B illustrates an example of control software configured to control hardware according to some example embodiments.

When the camera and detector are used together, position coordinates (e.g., global coordinate system) may be used to distinguish between objects by each measuring positions using their own coordinate system. After comparing and evaluating the difference (if any) between objects, certain example embodiments may derive two sets of measurements on a common plane. Specifically, the camera and detector may fuse the coordinates each detects of the same object to obtain a common set of coordinates; the fused coordinates may be in relation to the camera's coordinates, as shown in FIG. 1B.

Figure 3:
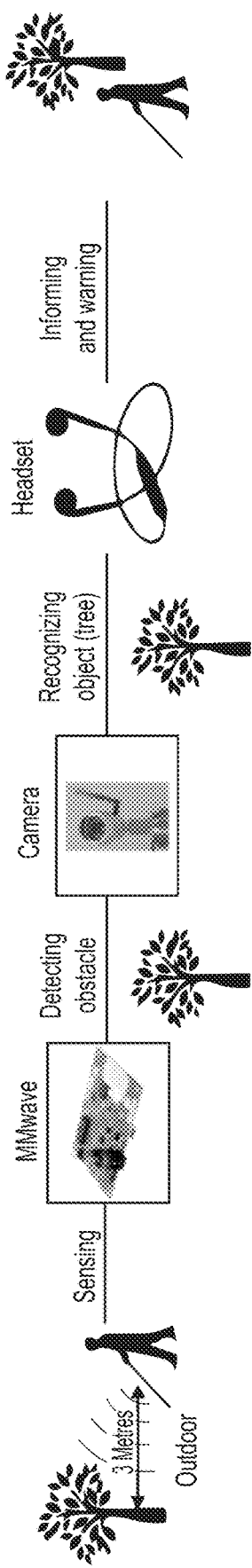
FIG. 3 illustrates an example of a procedure for detecting obstacles for visually-impaired people according to various example embodiments.

The camera and millimeter wave sensor can be coupled with a variety of computer vision applications, including for object detection, tracking and classification, counting and recognizing people, traffic management, and security aspects with high accuracy and reliability. In addition, some embodiments may be used for obstacle detection method for visually impaired people, as shown in FIG. 3. Furthermore, some embodiments may be used for drone detection and/or surveillance by drones, e.g., that can be used in large sporting events, such as the FIFA World Cup or for any other event.

Figure 5:
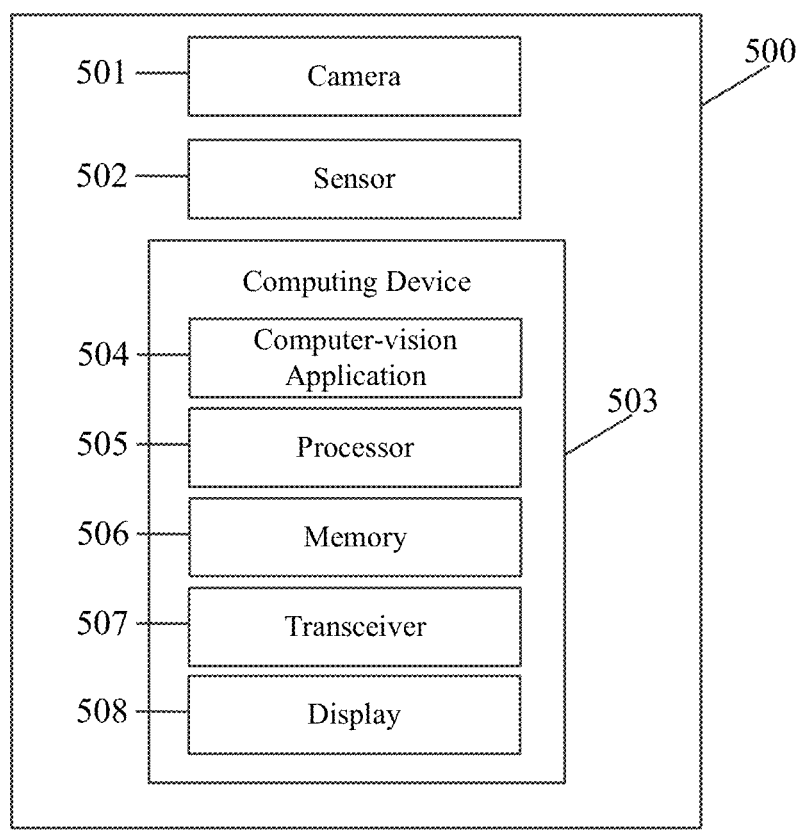
FIG. 5 illustrates an example of an apparatus according to various example embodiments.

FIG. 5 illustrates an example of an apparatus 500 for detecting, identifying, and monitoring objects. For example, apparatus 500 may include one or more of at least one camera 501, at least one sensor 502, and at least one computing device 503.

In some example embodiments, camera 501 may be a pan-tilt-zoom (PTZ) camera, thermal (FLIR) camera, dome camera, IP camera, wide dynamic security camera, mirrorless video camera, DSLR camera, bridge camera, compact camera, smartphone camera, or any combination thereof.

As an example, camera 501 may be a wide-view camera (e.g., Raspberry pi), and may be used in conjunction with a processor (e.g., Raspberry Pi 3 Model B+), a Texas Instruments (TI) short-range radar evaluation board, a power bank, and a wearable headset to provide a user with relevant information, guidance, and warnings. The power bank may provide power to each of the devices, for example, via a universal serial bus (USB) cable. The processor may run image processing and recognition processes using various programming languages, such as Python and MATLAB.

Camera 501 may be configured to detect different objects depending on the application. For example, the camera may be configured to detect objects using the Aggregate Channel Features (ACF) method trained using the INRIA person dataset. The camera may detect one or more objects. For all sensors, each object may be associated with a coordinate plane, where each object is associated with at least one coordinate in the coordinate plane. In certain example embodiments, objection detection may be based at least in part on video data captured by camera 501 using aggregate channel features (ACF); specifically, by evaluating channel features variation, features may be extracted directly as pixel values in extended channels without computing rectangular sums at various locations and scales. The detector may perform object-detection may be performed by an ACF method, and/or may be trained according to an INRIA person dataset.

In some example embodiments, when two sensors are used for one purpose, mapping their coordinates (for example, in a global coordinate system) may improve results since the sensors perform measurements in their own coordinate system. After relating the two coordinates, two sets of measurements are generated on a common plane. To obtain a common position for the two sensors, the position of the detected objects may be fused. Furthermore, the two coordinates may be related to the camera coordinates as shown in FIG. 1B. As an example, the Kalman filtering technique may fuse the positions of the objects may be fused using a Kalman filtering technique to accurately estimate a global position. In addition, since the process of the detected object may be tracked in both sensors using the Multiobject Integrated Probabilistic Data Association (MIPDA) method.

In various example embodiments, sensor 502 may be a millimeter wave sensor, such as a radar and/or lidar sensor. Sensor 502 may include bistatic radar, continuous-wave radar, Doppler radar, monopulse radar, passive radar, mapping radar, navigational radars, or any combination thereof. Sensor 502 may use frequency modulated continuous wave (FMCW) techniques, including frequency modulating on a continuous signal to obtain range and velocity information from radar data.

Computer-vision application 504 may be configured to fuse the at least one coordinate of the at least one object detected by camera 501 with the at least one coordinate of the same at least one object detected by sensor 502. In various example embodiments, coordinates (e.g., global coordinate system) of objects detected by camera 501 and sensor 502 may be combined in order to avoid using coordinates in their own coordinate system. After relating the coordinates of a single object detected by both camera 501 and sensor 502, certain embodiments may obtain two sets of measurements on the common plane. To obtain a common position for camera 501 and sensor 502, computer-vision application may be configured to fuse the detected object's position; the two coordinates may be related to coordinates of camera 501, as shown in FIG. 1B. In some example embodiments, the fusing may be performed according to a Kalman filtering technique (i.e., linear quadratic estimation), which may be accurate in estimating a global position. Additionally or alternatively, since certain example embodiments may consider tracking the process of the detected object in both camera 501 and sensor 502, certain embodiments may apply a multi-object integrated probabilistic data association (MIPDA) method.

In certain example embodiments, computer vision application 504 may be configured to determine whether the number of objects detected by camera 501 equals the number of objects detected by sensor 502. As an example, if the number of detected objects is not equal (i.e., accuracy may be a consideration), the steps may be processed in another way, as shown in FIG. 2. For example, FIG. 4 illustrates overlapping people in which the number of objects detected by camera 501 and sensor 502 is not equal. For example, camera 501 may detect 2 people, while sensor 502 may detect 3 people. In some embodiments, computer-vision application 504 may perform one or more additional functions, such as object counting, object recognition, and face recognition.

As shown in FIG. 2, in various example embodiments, computer-vision application 504 may be configured to determine, after sensing the environment, if information obtained from camera 501 and sensor 502 is not equal, displaying frames related at that time to a human operator for enhanced processing. For example, FIG. 4 depicts overlapping people; thus, when the results of camera 501 and sensor 502 are not equal, since the radar detects 3 people, while the camera detects 2 people. As a result, the decision process may repeat for the computer vision subsystems.

In various example embodiments, computer-vision application 504 may be configured to determine whether a score associated with the one or more additional functions is below a predetermined threshold. If the score associated with the one or more additional functions is below a predetermined threshold, computer-vision application 504 prompts a human operator for further input. If the score associated with the one or more additional functions equals or is above the predetermined threshold, computer-vision application 504 may continue with an automatic process. In some example embodiments, the predetermined threshold may depend on the degree of application sensitivity. The information captured by camera 501 and sensor 502, the detection results, and any prompts for input to a human operator may be presented in a headset or other computing device, including computing device 503. As an example, the headset or other computing device, such as display 508, may display the number of detected people.

Computing device 503 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Camera 501, sensor 502, and computing device 503 may include at least one processor, such as processor 50. Processors may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, such as memory 506. The memory may be fixed or removable. The memory may include computer program instructions or computer code contained therein. Memories may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors and memories may be configured to provide means corresponding to the various blocks of FIGS. 1-6. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

According to certain example embodiments, processor 505 and memory 506 may be included in or may form a part of processing circuitry or control circuitry. In addition, in some example embodiments, transceiver 507 may be included in or may form a part of transceiving circuitry.

Figure 6:
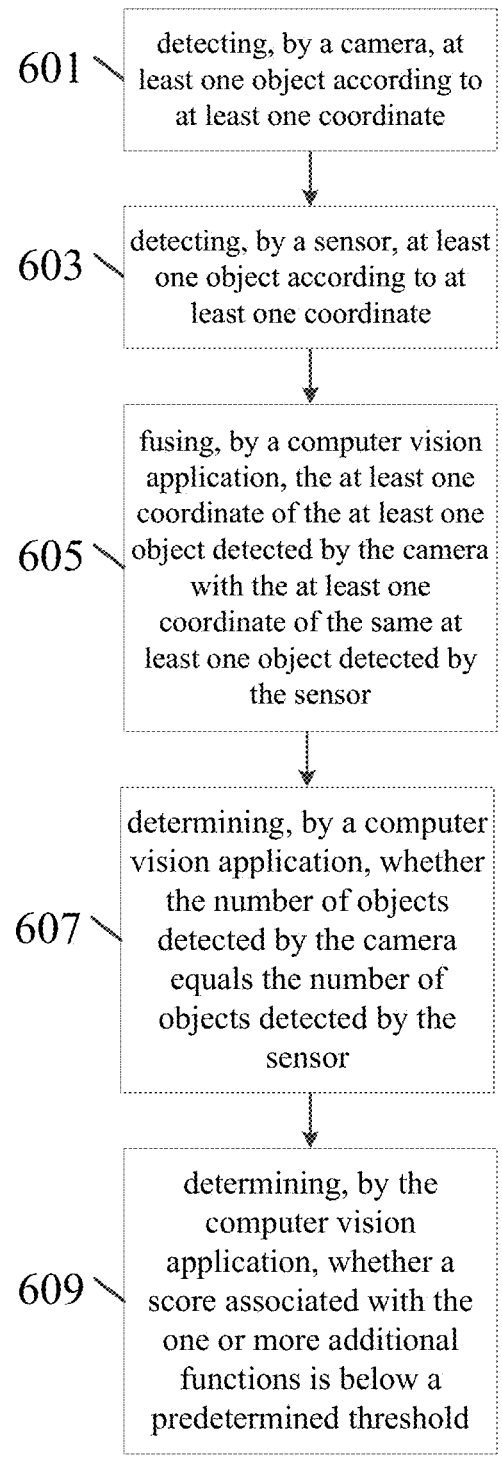
FIG. 6 illustrates an example of a method for object detection by radar and camera according to some example embodiments.

FIG. 6 illustrates an example of a flow diagram of a method that may be performed by an apparatus or system, such as apparatus 500 illustrated in FIG. 5, according to various example embodiments. At 601, the method may include detecting, by a camera, at least one object according to at least one coordinate.

In some example embodiments, the camera may be a pan-tilt-zoom (PTZ) camera, thermal (FLIR) camera, dome camera, IP camera, wide dynamic security camera, mirrorless video camera, DSLR camera, bridge camera, compact camera, smartphone camera, or any combination thereof.

As an example, the camera may be a wide-view camera (e.g., Raspberry pi), and may be used in conjunction with a processor (e.g., Raspberry Pi 3 Model B+), a Texas Instruments (TI) short-range radar evaluation board, a power bank, and a wearable headset to provide a user with relevant information, guidance, and warnings. The power bank may provide power to each of the devices, for example, via a universal serial bus (USB) cable. The processor may run image processing and recognition processes using various programming languages, such as Python and MATLAB.

In some embodiments, the method may further include the camera detecting at least one object according to at least one coordinate. In certain example embodiments, objection detection may be based at least in part on video data captured by the camera using aggregate channel features (ACF); specifically, by evaluating channel features variation, features may be extracted directly as pixel values in extended channels without computing rectangular sums at various locations and scales. The detector may perform object-detection may be performed by an ACF method, and/or may be trained according to an INRIA person dataset.

At 603, the method may further include detecting, by a sensor, at least one object according to at least one coordinate. In various example embodiments, the sensor may be a millimeter wave sensor, such as a radar and/or lidar sensor. The sensor may include bistatic radar, continuous-wave radar, Doppler radar, monopulse radar, passive radar, mapping radar, navigational radars, or any combination thereof. The sensor may use frequency modulated continuous wave (FMCW) techniques, including frequency modulating on a continuous signal to obtain range and velocity information from radar data.

At 605, the method may further include fusing, by a computer vision application, the at least one coordinate of the at least one object detected by the camera with the at least one coordinate of the same at least one object detected by the sensor. In various example embodiments, coordinates (e.g., global coordinate system) of objects detected by the camera and sensor may be combined in order to avoid using coordinates in their own coordinate system. After relating the coordinates of a single object detected by both the camera and sensor, certain embodiments may obtain two sets of measurements on the common plane. To obtain a common position for the camera and sensor, certain embodiments may fuse the detected object's position; the two coordinates may be related in the camera's coordinates as shown in FIG. 1B. In some example embodiments, the fusing may be performed according to a Kalman filtering technique, which may be accurate in estimating a global position. Additionally or alternatively, since certain example embodiments may consider tracking the process of the detected object in both the camera and sensor, certain embodiments may apply a multi-object integrated probabilistic data association (MIPDA) method.

At 607, the method may further include determining, by a computer vision application, whether the number of objects detected by the camera equals the number of objects detected by the sensor. As an example, if the number of detected objects is not equal (i.e., accuracy may be a consideration), the steps may be processed in another way, as shown in FIG. 2. For example, FIG. 3 illustrates that overlapping people may be shown in which the number of objects detected by the camera and sensor is not equal. For example, the millimeter wave sensor may detect 3 people, while the camera may detect 2 people. In some embodiments, the computer vision application may perform one or more additional functions, such as object counting, object recognition, and face recognition.

As shown in FIG. 2, various example embodiments may include determining, after sensing the environment, if information obtained from the camera and sensor is not equal, displaying frames related at that time to a human operator for enhanced processing. For example, FIG. 4 depicts overlapping people; thus, which the results of the camera and sensor are not equal, since the sensor detects 3 people, while the camera detects 2 people. As a result, the decision process may repeat for the computer vision subsystems.

At 609, the method may further include determining, by the computer vision application, whether a score associated with the one or more additional functions is below a predetermined threshold. If the score associated with the one or more additional functions is below a predetermined threshold, the computer vision application prompts a human operator for further input. If the score associated with the one or more additional functions equals or is above the predetermined threshold, the computer vision application continues with an automatic process. In some example embodiments, the predetermined a threshold may depend on the degree of application sensitivity. The information captured by the camera and sensor, the detection results, and any prompts for input to a human operator, may be presented in a headset or other computing device. As an example, the headset or other computing device may display the number of detected people.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

ACF Aggregate Channel Features
FMCW Frequency Modulated Continuous Wave
FOV Field of View
GPS Global Positioning System
MIPDA Multi-Object Integrated Probabilistic Data Association
PTZ Pan-Tilt-Zoom
USB Universal Serial Bus

We claim:

1. An apparatus, comprising:
at least one camera;
at least one sensor configured to obtain range and velocity information by performing frequency modulating on a continuous signal;
at least one computing device configured to run a computer-vision application configured to:
receive data from the at least one camera indicating a location of at least one object detected by the at least one camera, wherein the at least one camera is configured to capture video data according to aggregate channel features by evaluating channel features variation and extracting features directly as pixel values in extended channels without computing rectangular sums at various locations and scales;

receive data from the at least one sensor indicating a location of at least one object detected by the at least one sensor;

determine whether a confidence score is less than a selected threshold; and fuse the location data received from the at least one camera and the location data from the at least one sensor associated with the same detected object into a common coordinate set, wherein the fusing comprises a Kalman filtering technique and a multi-object integrated probabilistic data association method; and a display device configured to, upon the at least one computer-vision application determining that the confidence score is below the selected threshold, prompt a human operator for further input.

2. The apparatus of claim 1, wherein the at least one camera comprises a Raspberry Pi wide camera.

3. The apparatus of claim 1, wherein the at least one sensor comprises at least one millimeter wave sensor.

4. The apparatus of claim 3, wherein the at least one millimeter wave sensor comprises a radar sensor.

5. The apparatus of claim 4, wherein the at least one millimeter wave sensor is configured to detect objects according to a frequency modulated continuous wave technique.

6. The apparatus of claim 1, wherein the at least one computer-vision application is configured to perform at least one of the following:
- object counting;
- object recognition; and
- facial recognition.

7. The apparatus of claim 1, wherein the at least one computer-vision application is configured to determine the confidence score.

8. The apparatus of claim 1, further comprising:
a display device configured to, upon the at least one computer-vision application determining that the confidence score is at least the selected threshold, continue with an automatic process.

9. A method, comprising:
detecting, by a camera, at least one object according to at least one coordinate, wherein the at least one camera is configured to capture video data according to aggregate channel features by evaluating channel features variation and extracting features directly as pixel values in extended channels without computing rectangular sums at various locations and scales;

detecting, by a sensor, at least one object according to at least one coordinate, wherein the sensor is configured to obtain range and velocity information by performing frequency modulating on a continuous signal;

determining whether a confidence score is less than a selected threshold;

fusing, by a computer vision application, the at least one coordinate of the at least one object detected by the camera with the at least one coordinate of the same at least one object detected by the sensor, wherein the fusing comprises a Kalman filtering technique and a multi-object integrated probabilistic data association method;

determining, by a computer vision application, whether the number of objects detected by the camera equals the number of objects detected by the sensor;

determining, by the computer vision application, whether a score associated with the one or more additional functions is below a predetermined threshold; and upon determining that the score associated with the one or more additional functions is below a predetermined threshold, prompting a human operator for further input.

10. The method of claim 9, further comprising:
upon determining that the score associated with the one or more additional functions equals or is above the predetermined threshold, continuing with an automatic process.

11. The method of claim 9, wherein the at least one sensor comprises at least one millimeter wave sensor.

12. The method of claim 11, wherein the at least one millimeter wave sensor comprises a radar sensor.

13. The method of claim 12, wherein the at least one millimeter wave sensor is configured to detect objects according to a frequency modulated continuous wave technique.

* * * * *